March 3, 1970

S. RIKHOF 3,498,594

CEMENT BURNING PROCESS AND APPARATUS

Filed Oct. 17, 1966

INVENTOR.
SOPHUS RIKHOF
BY
Gardner & Zimmerman
ATTORNEYS 3,498,594
CEMENT BURNING PROCESS AND APPARATUS
Sophus Rikhof, Riverside, Calif.
(12405 Copenhaver Terrace, Potomac, Md. 20854)
Filed Oct. 17, 1966, Ser. No. 587,160
Int. Cl. C04b 7/06, 7/44; F27d 27/00
U.S. Cl. 263—21     20 Claims

ABSTRACT OF THE DISCLOSURE

Cement is produced from pulverized raw materials by preheating, calcining, clinkering, and cooling the raw materials in successive separate units in a counter-current of gases. The gases are used to suspend the pulverized raw materials in the preheater, calciner, and clinkerer, and to distribute the heat liberated in the clinker cooler and clinkerer to the raw material feed. Raw materials containing alkalis and volatiles may be used to produce quality cement products by apportioning the raw material feed between the direct and indirect preheater units and channeling hot gases obtained from the clinkerer exclusively through said indirect preheater. Means for adjusting the flow of raw materials and gases disposed in the raw material and gas lines between successive units provide controls and maximized product quality and heat economy.

---

Figure 1:
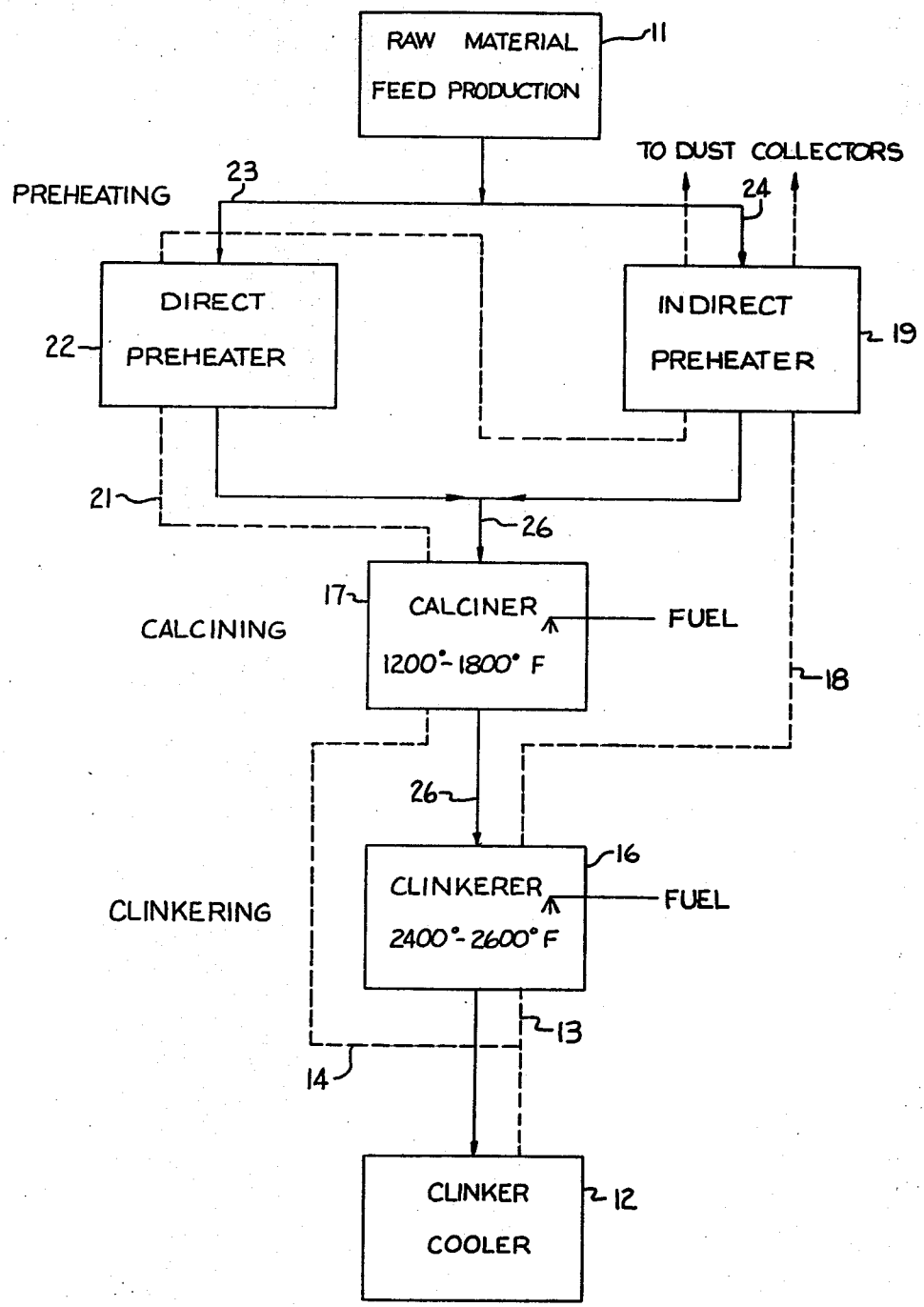

The present invention relates to a method and apparatus for producing particulate clinkers of predetermined particle size from pulverized raw materials. More particularly, this invention relates to an integrated cement burning facility and a burning process in which clinkers are produced in distinct successive operations of preheating, calcining and sintering of a raw material feed which is suspended in an air current. The air current is routed through the facility to recover and distribute heat from the exothermic to the endothermic processes, to floatate the pulverized raw materials and to support the combustion of fuel in the sintering and calcining steps.

The present process is applicable to the production of all types of cement, including portland cement, as well as the large varieties of special purpose cements. All cements basically consists of a mixture of argillaceous materials such as clays and shales; and calcareous materials, such as marls, chalk and limestone. The former materials furnish silica and alumina, and the latter furnish calcium carbonate, the chief ingredient of cement.

Depending on the type of cement which is to be produced, these materials are crushed, pulverized and mixed in the proper proportion, and are thereafter calcined, sintered, and ground to produce the finished cement product.

More specifically, in the conventional cement producing process, rocks or minerals from a quarry are first broken, crushed, and milled to reduce the particle size of the rocks. The ground constituents are then mixed in the desired proportion according to their calcium carbonate, silica and alumina contents, either by dry mixing the pulverized constituents or by producing a water slurry thereof. The dry or wet mixture, hereinafter referred to as the raw material feed, is then burnt, i.e., first heated to a temperature between about 1200° and 1800° F. to calcine the material, and thereafter heated to between about 2400° and 2600° F. to sinter the calcined material. The clinkers produced in the sintering step are then finely ground and packaged for marketing.

Heretofore, the calcining and clinkering of the raw material feed has customarily been carried out in large rotary kilns which are cylindrical, firebrick-lined steel tubes of a length up to about 650 feet. These kilns are mounted to be rotatable about their central axis, which is inclined at an angle with respect to the horizontal. The raw material is fed into the upper end of the kiln, and the kiln is rotated to cause the raw material to slowly slide downward through the kiln. Combustion of a fuel injected into the lower end of the kiln supplies the heat necessary to calcine and clinker the raw material in progressively lower zones of the kiln as such material passes through the kiln. There are various disadvantages inherent in the burning of cement in rotary kiln facilities. First and foremost among these is the tremendous capital expenditure necessary to build such a kiln. The large size and length of the steel tube and the necessity of rotating it about an inclined axis pose serious mechanical problems due to differential thermal expansion and the continuous bending forces acting on the kiln.

Another problem curtailing the efficiency of a rotary kiln plant is the poor heat economy of the kiln. This poor heat economy is primarily due to the inefficient manner in which the raw material is heated, i.e., by conduction of heat from the kiln lining to the raw material and by gas contacting the raw material. Also, the relatively large surface area of the kiln produces appreciable heat losses.

A third serious disadvantage is the lack of flexibility and control over the entire process because the individual steps of preheating, calcining and clinkering are not independently variable since they are all functions of the kiln disposition and movement, and the amount of heat input and transfer characteristics. Because of this, control of the alkali content of the clinkers is particularly elusive in shorter kilns, or where raw materials with high alkali contents are used. A large fraction of the alkalis are volatilized in the sintering step and are removed with the gaseous combustion products as they escape from the upper end of the kiln. However, a finite quantity of alkalis are condensed and reabsorbed by the raw material at the upper end of the kiln. The total quantity of the alkalis present in the raw material feed is therefore steadily increased, which causes a proportional increase in the alkali content of the finished product. Accordingly, only rocks having a small alkali content are suitable for use in rotary kilns, especially shorter rotary kilns, unless the alkali content is first reduced by expensive assaying procedures.

Now, however, I have invented a cement burning process and a plant facility for carrying out the same which do not suffer from the inherent disadvantages of rotary kiln cement burning processes and plants. According to my process, the conventional raw material feed mixture is preheated, calcined and clinkered in successive stages and in different units of operation adapted for the specific reaction step. Since each reaction step is carried out in a separate facility, each operation is independently variable for maximum flexibility and control. Furthermore, each unit is a simple stationary piece of equipment without moving parts, whence this facility is relatively inexpensive and has a long service life.

In accordance with my process, the raw material feed is first preheated in separate preheaters by the hot waste gases derived from the calcining, clinkering and clinker cooling processes. A preferred preheating apparatus includes direct and indirect preheaters, the former for utilizing the gases heated in the calcining processes, and the latter for utilizing the heat imparted to the gases in the clinkering step in which the undesirable alkali vapors are produced. The air for the combustion in the clinker and calcining units is of course, passed through the clinker cooling unit to raise the air's temperature. The raw materials being preheated and calcined are thus kept out of contact with the alkalis eliminated from the materials when they are sintered, thereby not leaving any chance for condensation on the raw materials.

The next operation in the process is the calcining of the raw materials, which essentially consists of heating the calcerous materials to a temperature of about 1200°–1800° F. whereby the calcium carbonate is converted into calcium oxide, accompanied by the evolution of carbon dioxide.

The calcining furnace is an insulated enclosure with fuel injection means, and gas and raw material inlets and outlets. The raw material is airborne and a current of incoming preheated air is directed against the preheated raw materials to impede the progress of the airborne raw material particles through the calciner for a sufficient length of time to allow substantial calcination of the calcareous constituents. The heat for the calcining is supplied by a suitable fuel which is preferably a gas or combustible liquid which can be directly injected into the air stream.

The calcined material is then transported into the sintering furnace, or clinkerer, where its temperature is raised to about 2400°–2600° F. This clinker treatment unit is a furnace similar to the calciner, in that it comprises a heat-insulated enclosure which is outfitted with fuel injection means for introducing a combustible fuel such as gas or fuel oil. The furnace further includes a raw material inlet and outlet, and inlet and outlet means for directing a counter air current against the descending raw materials. The raw material and gas inlets and outlets in the sintering furnace are preferably arranged to suspend the incoming particles in a fluidized bed, whereby volatilization of alkalis and heat transfer characteristics are significantly enhanced. As the particles grow by being fused together during the sintering process, they are able to descend against the air current nad leave the sintering furnace. Adjustment of the air velocity allows control of the particle size of the finished clinkers, i.e., the faster the airstream, the larger the fused clinkers have to be in order to descend therethrough. After descending through the sintering furnace, the particles proceed into the clinker cooler. By this method the heat transfer characteristics between the clinkers and the gas coolant in the clinker cooler is greatly enhanced, and subsequent handling and grinding of the clinkers facilitated.

Accordingly, it is a principal object of my invention to provide an economical, stationary cement burning apparatus of low initial cost having a long life expectancy.

A further object of my invention is to provide a cement burning process of reduced fuel consumption per unit of output by efficient use and recovery of the heat supplied in the calcining and clinkering steps of the process, and by providing improved heat transfer conditions.

Still another object of the present invention is to provide a cement burning process and an apparatus for treating cement raw material in an airborne state by a fluidized bed type of technique, productive of improved heat transfer conditions and a high degree of control over the individual steps of the process.

A still further object of my invention is to provide a process of facility for burning cement, which is capable of utilizing feed materials of higher alkali contents without increasing the alkali content of the finished cement product.

The invention possesses other objects and features of advantage, some of which, with the foregoing will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Figure 2:
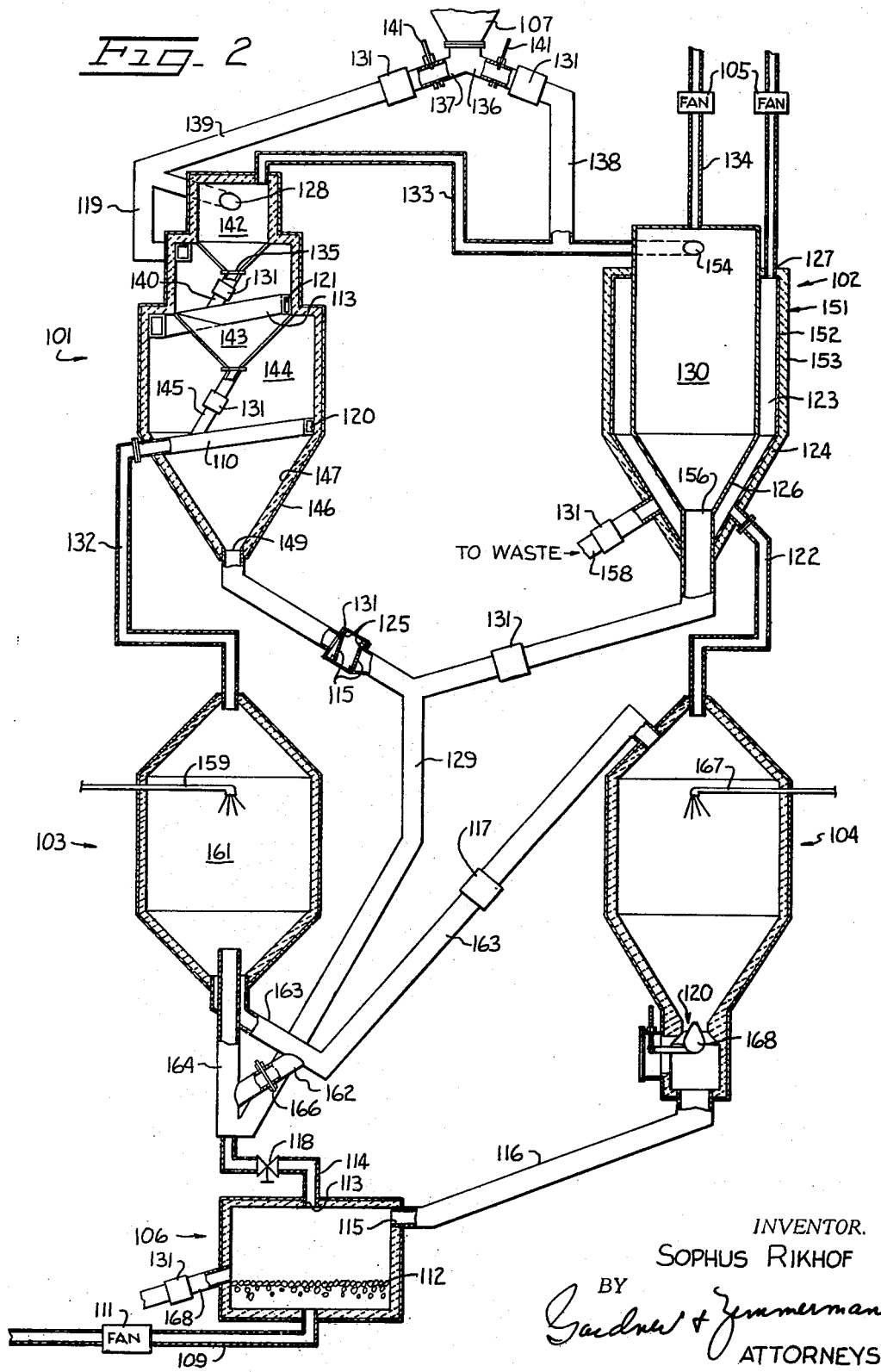

FIGURE 1 represents a flow chart of the process, and FIGURE 2 is a schematic diagram of a preferred cement burning plant according to the present invention.

In general, the present process comprises the steps of preheating, calcining and sintering the raw material feed prepared by the preliminary crushing, milling and mixing operation. In the calcining and sintering steps, the raw material feed must be raised to high temperatures with the expenditure of considerable energy. A large part of the energy is consumed by the endothermic calcining reaction; however, a significant fraction of the energy goes into heating the raw material and the gases partaking in the combustion of the fuel. A large fraction of the energy is recovered from the cooling clinkers.

The basic chemical and physical operations carried out in the present facility are thus essentially the same as in the conventional cement burning process, and successively comprise (a) bringing the raw material close to the calcining temperature by preheating, (b) calcining the raw material by elevating its temperature to about 1200–1800° F., whereby carbon dioxide is driven from the calcium carbonate contents, and (c) sintering or clinkering the calcined material at about 2400–2600° F. to produce clinkers, which are cooled and ground into the finished cement product.

In accordance with the present invention, it is contemplated to recover the heat energy residing in the hot clinkers as completely as possible by passing the gaseous media required in the calcining and clinkering operations through the cooling clinker bed in the fashion of a coolant. The total energy expenditure is thus limited to the heat content of the finished clinkers over that of the incoming raw materials, plus the energy consumed in the endothermic reactions plus heat losses from the apparatus.

A major feature of the present process concerns the nature and quantity of the gas medium and the interrelationship between the gas flow medium, raw material feed, and the design of the facilities employed. The gaseous medium is employed to suspend that raw material feed in an airborne fashion in each of the units of operation and also to support the combustion of the fuel in the calcining and sintering operations. The rate at which fuel is used is determined by the rate at which raw materials are passed through the individual units of operation.

In the simples case, a cement burning facility for processing essentially alkali free raw materials comprises a single preheater, a combined calcining and sintering furnace and a clinker cooler. The pulverized raw materials pass progressively through each of these units and are heated progressively to the calcining and sintering temperatures by heat exchange with the hot gas counter stream and the combustion of fuel in the furnce. The gas (air) is used to cool the clinkers in the clinker cooling unit, whereby the heat energy residing in the hot clinkers is recovered. Further, the gas serves the purposes of supporting the combustion of a fuel injected into the furnace, preheating the raw materials in the preheater, and suspending the pulverized raw material particles in the preheater and furnace. When the raw material particles sinter and attain a sufficient predetermined size, which can be controlled by varying the velocity of the gas counter current, they drop from the furnace into the clinker cooling unit. The details of this general simplified process will become apparent below in the discussion of preferred embodiment of the present cement burning facility capable of processing raw materials having a higher alkali content.

The process of the present invention is further detailed in the flow diagram shown in FIGURE 1. The solid lines represent the flow of the raw material feed, and the broken lines indicate the flow of the gaseous medium. The diagrammatic box 11 represents the preliminary processing of the cement ingredients, e.g., crushing, milling and mixing, whereby a powdery dry or wet mix is produced as in conventional cement burning processes. This starting material is the raw material feed for the present cement burning facility.

The gas medium, more specifically air, needed in the individual units of operation is introduced into the facility through the finished clinkers. The air thus serves the dual purpose of cooling the clinkers, as well as being itself preheated. The rate at which air is forced through the clinker cooler is equal to the rate at which air is needed or "used" in the clinkering and calcining operations. As mentioned supra, undesirable alkalis are volatilized during the sintering step and enter the gas or air stream. Since these alkalis are capable of being reabsorbed by the raw materials at a lower temperature, the gases emerging from the clinker unit are isolated from the raw material feed from the point on. Accordingly, the air stream obtained from the clinker cooler 12 is split into two portions 13 and 14, the former portion 13 being routed through the clinkering or sintering unit 16, and the latter portion 14 being routed through the calciner 17. The ratio of the two consituent air streams is of course determined by the air flow requirements of the sintering and calcining units, respectievly. The air requirements of the calciner are always greater due to the larger fuel requirements necessary for the calcining operation.

The portion 13 of the air which is ducted into the clinkering unit 16 is passed through a suitable nozzle inlet to suspend clinker particles below a critical particle size. The oxygen in the air is largely consumed by the combustion of the fuel injected into the clinker unit. The hot gaseous combustion products including the volatile alkali contaminants, are then routed as indicated by the numeral 18 into an indirect preheating unit 19 where the heat energy of the gas stream is discharged to a heating jacket type element which surrounds the passage for the incoming raw materials. The cooled gases are then led from the indirect heating unit 19 to a fan and dust collector prior to venting.

The portion 14 of the air which has been preheated in the clinker cooler is passed into the calciner 17, where it renders the incoming particles airborne and supports combustion of the fuel required for the calcining process. The gas stream emerging from the calciner includes the combustion products as well as the large quantities of carbon dioxide liberated in the calcining reaction. This stream represented by the dotted line labelled 21 is passed directly into a direct preheater 22, where it is used to establish a counter current against the incoming raw material feed to suspend it and transfer most of their heat content to the feed particles by direct contact therewith.

According to a preferred embodiment, as indicated in the flow chart, the direct and indirect preheaters are separate units of operation. However, it will be understood that these preheating units could readily be combined into a single preheating facility, combining both functions. However, such an arrangement is not as advantageous as the preferred split preheater arrangement for reasons further disclosed below.

As contemplated in the preferred embodiment of the process as illustrated in the flow chart, the gases from the direct preheater are also utilized in the indirect preheater. More particularly, after emerging from the direct preheater 22 they are passed into the indirect preheater 19 utilized to suspend the fraction of the raw material feed introduced into the indirect preheater 19 and dissipate the remainder of their heat energy by direct contact with the feed particles. Thereafter the cooled gas is passed through a fan and dust collector and discharge or vented similarly as portion 18 of the gas stream.

The raw material feed 11 is divided into two fractions, labelled 23 and 24, respectively. The fraction 23 is fed into the direct preheater and the fraction 24 is fed into the indirect preheater. The relative sizes of these fractions are determined by the energy content and flow rate of the gases flowing along paths 18 and 21. In general, the gases flowing along path 21 are at a lower temperature, more specifically at a temperature prevailing in the calciner 17, i.e., generally about 1200–1800° F., while the gases emerging from the clinkerer 16 are at the clinkering temperature, or at about 2400–2600° F. However, the gas flows at an appreciably higher rate along path 21. Because of this and since the heat transfer characteristics of the direct energy exchanged are superior to the indirect heat exchange, by far the larger fraction of the raw materials is passed into the direct preheater along path 23. Generally the ratio of the quantity of feed material moving along path 23 to the quantity moving along path 24 is between 4 and 5 to 1. After preheating, the raw materials from the indirect and direct preheaters are recombined and successively fed into the calcining and sintering furnaces as indicated by solid line 26.

A proposed plant facility and attendant equipment is shown schematically in FIGURE 2. The major units of operation are a direct preheater 101, an indirect preheater 102, a calciner 103, a sintering unit 104, and a clinker cooler 106. These units of operation are interconnected by raw material feed lines, shown in full as pipes, and by the gas lines, shown in cross-section. In practice, the raw material and gas conveying system is of course standard heat insulated equipment. It will also be realized that the equipment is preferably arranged in such a fashion that the raw material feed input 107 is at a higher elevation than the output opening 108 and that the remainder of the equipment is disposed to allow the raw materials to descend through the facility by gravity. However, since the raw material feed used is generally in a finely divided state, they are readily transported from one unit to another by means of forced air or conveyors, for example, if desired.

In accordance with the discussion with reference to the flow diagram, air is forced into the clinker cooler 106 through air duct 109 by means of fan 111 and/or is drawn through the system by means of draft fans 105 installed in the air ducts near outlets 134 and 127. The bed of clinker particles 112 is thereby cooled with the heat therefrom being taken up by the incoming air stream. This preheated air emerges from the clinker cooler through outlets 113 and 115 and is distributed to the clinkering unit 104 and calcining furnace 103 via air duct 114 and raw material line 116. The air preferentially moves along the low impedance path through the air ducts. However, in addition, escape of air into the raw material feed lines, especially between the calcining and clinkering units 103 and 104, is blocked by means of air lock 117 disposed in the feed line 163 adjacent clinkering unit 104. This air lock unidirectionally impedes the flow of air or other materials. A simple preferred airlock 131 is shown in detail in the figure and comprises a series of flaps 115 which are readily bent by the raw materials sliding down the bottom of the duct and through flanged apertures 125. However, air moving in the opposite direction presses the flaps 115 against the flanges along apertures 125, whereby the duct is sealed. The relative flow rates of air into clinkering unit and calcining unit 103 is adjustable by varying the speed of the draft fans 105. Other means for apportioning the air flow could be used, for example, by means of a suitable flow regulator such as, for example, valve 118 disposed in the air line 114 leading into the calcining unit in conjunction with a single draft fan. The air inlet 120 into the clinkering unit 104 is suitably restricted to increase the velocity of the air flow in order to fluidize raw material particles below a critical size in the clinkering furnace. Air lock 117 disposed in the raw material passage leading into the clinkerer 104 prevents air in the unit 104 from flowing with the raw material. The gas therefore flows from the clinkerer into the indirect preheater 102 via duct 122. In the indirect preheater 102, this air, which includes volatilized potassium and sodium oxides, is circulated through the outer chamber 123, defined by the outer wall 124 and inner funnel shaped envelope 126. The spent gases finally escape through outlet 127, after most of the heat content of the gas has been transferred to the preheater and indirectly to the raw material feed passing therethrough.

The preheated air passing through duct 114 is directed into the raw material feed line 129 and carries the finely divided feed material into the calciner 103. Air locks 131 keep the gases flowing into and through calciner 103 and from there on into the direct preheater 101 via duct 132. The hot air from the calciner is introduced into the bottom of the preheater 101 and flows upward through the descending raw materials in heat exchanging relation therewith. From the direct preheater 101, the gases are channelled into the interior chamber 130 of the indirect preheater via duct 133. Prior to entry into the indirect preheater, the gases are combined with the pulverized raw material portion transported through feed line 138. The resulting feed is tangentially injected into chamber 130 through inlet 154. From the interior chamber 130, the gases escape through outlet 134, after imparting most of their energy to the incoming raw material feed. The raw material slides down along the interior walls of chamber 130 in a spiral motion as in a conventional cyclone heat exchanger.

The raw material feed prepared by the preliminary crushing, milling and mixing operation is introduced into the system through inlet 107, which may be a hopper-like arrangement having two openings 136 and 137 leading to ducts 138 and 139 and on into the indirect and direct preheaters respectively. The relative quantities of raw materials introduced into the preheaters may be controlled by varying the cross sectional areas of the throat of openings 136 and 137, for example, by means of suitable diaphragms 141.

Preferred direct preheaters 101, as shown in the drawing, comprises a plurality, in this instance three, stacked and nested heat exchangers 142, 143, and 144, of successively larger size to compensate for the contraction of the gases as they are cooled by the interaction with the raw materials and to improve the counter current flow properties of the gas. The interior walls 147 of the preheater are preferably brickwork, or other suitable heat insulating material disposed on an outer steel shell 146. The raw materials are agitated and flotated in the individual heat exchanger compartments 142, 143, and 144, and emerge through the raw material outlet 149 at a considerably elevated temperature.

More specifically, a preferred direct preheater unit 101 comprises three stacked and nested individual compartments 142, 143 and 144, which are successively interconnected by a series of ducts 113 and 119, through which the air is channeled from each compartment to the next. The hot air and combustion products issuing from the calciner are introduced into compartment 144 through internal duct 110, which is connected to gas line 132. Each of these ducts 110, 113 and 119 project tangentially into the respective compartments and introduce a mixture of hot gases and raw materials thereinto through ports 120, 121 and 128, respectively. The raw materials coming from each compartment are introduced into the gas duct leading into the next lower compartment through feed lines 140 and 145. Thus, the incoming raw material feed from feed line 139 is combined with the air moving through duct 119 from compartment 143 to compartment 142, and is injected tangentially into compartment 142 through the force of the air stream via inlet port 128. After descending through compartment 142 in spiral fashion, the raw material escapes through outlet 135 and through line 140 into duct 113. The raw material is then injected into compartment 143 in similar fashion through port 121. From this compartment, the further heated raw materials are introduced through line 145 into duct 110 which carries the incoming hot gases from the calciner. Finally the preheated material descends into raw material line 129 through outlet 149. Air locks 131 are disposed in each of the raw material ducts to prevent escape of air therethrough.

The indirect preheater 102 comprises an inner chamber 130, defined by a relatively thin-walled, heat conducting envelope 126, e.g., of stainless steel, and an annular outer chamber 123 bounded by envelope 126 and by the outer wall 151, which may be brickwork, or may be constructed of a stainless steel shell 152 covered with a heavy heat insulating layer 153 of a suitable material. The outer chamber 123 serves as a conduit for the hot alkali-laden gases derived from the sintering unit 104. The raw material feed is introduced into the central chamber 130 via inlet 154 and emerges through opening 156 at the bottom of chamber 130 into raw material outlet 158.

The preheated raw materials are then recombined and transported into the calciner through raw material feed line 129.

While the dual unit preheater arrangement shown could be combined into a single unit comprising an outer indirect heating jacket and an inner chamber, or complex of chambers, for direct heat exchange between the calciner derived gases and the raw material feed, the dual arrangement shown has distinct advantages, principally owing to lower construction costs and the heat economy aspect of the system.

The preheated raw materials are blown into calciner 103 by means of air supplied by duct 114. Fuel is directly injected into the calciner through fuel injection system 159. For maximum heating efficiency, the fuel is preferably atomized and sprayed into the raw material particle cloud susepnded in the central combustion chamber 161 of the calciner by the air blast from below. The duration of particle suspension can be controlled by adjusting the force of air blast delivered by duct 114 to insure sufficiently complete calcination. As a further control feature, the present system incorporates a feed back passage 162 connecting the raw material outlet portion 163 with are inlet portion 164. Thus, if the degree of calcination falls below an acceptable minimum, i.e., generally about 95%, sliding shutter 166 may be opened to allow the recirculation of a fraction of the material emerging from the calciner.

The calcined raw materials are then fed into the clinker unit, where they are suspended as a fluidized bed by the forced air stream entering the clinkerer from the bottom. A combustible fuel is again directly injected into the mass of flotated particles via fuel injection system 167. The clinkering temperature is 2400–2600° F., accordingly, the particles must remain suspended for a sufficient period to attain this temperature. This is readily accomplished by adjusting the force and flow rate of the incoming air stream to stably suspend the incoming particles as by providing an inlet of variable configuration 168. Once the particle temperature has been raised to the sintering temperature of about 2400–2600° F. the particles fuse together. As the particles grow in size, they reach a point at which they are no longer suspended and they descend into the annular raw material outlet, from whence they pass into the clinker cooler 106.

Further details of the present process and specific operating parameters will be set forth in the following example.

EXAMPLE

A pilot plant operation based on 600 pounds of pulverized and mixed raw material feed is carried out in accordance with the method described above as follows:

The raw material feed is divided into two portions and fed into the direct and indirect preheaters in the ratio of 490:110 pounds respectively, corresponding to the heat recoverable from the gases derived from the calcining and clinkering furnaces. The starting temperature of the raw materials is generally somewhat above room temperature due to the milling pretreatment, or generally about 80° F. The 490 pounds of raw material routed through the direct preheater emerges therefrom at a temperature of about 1375° F. This temperature rise is imparted to the raw materials by the direct heat exchange with the gases obtained from the calciner. These gases are a mixture of 235 pounds of carbon dioxide obtained from the calcining step, and 255 pounds of air and combustion products. They enter the direct preheater at a temperature essentially equal to that prevailing in the calciner, i.e., about 1800° F. The gases emerge from the three-stage preheater at a temperature of about 525° F.

The 110 pound portion of the raw material feed is completely heated to the calcining temperature of 1800° F. by indirect heat exchange, with 82 pounds of air at 2500° F. obtained from the clinkering unit, and by direct heat exchange with the 490 pounds of gas obtained from the direct preheater at 525° F. When the gases are vented from the indirect preheater, they are at temperatures of approximately 685° F. (clinkering gases) and approximately 447° F. (calcining gases).

The combined preheated raw material feed is then charged into the calciner and completely heated to 1800° F. and calcined, which is an endothermic reaction requiring about 240,000 B.t.u. per barrel of clinker produced. The total heat requirement to be supplied by combustion of fuel in the calciner is about 300,000 B.t.u., which is expended to heat the air required to burn the oil and the active mass of raw material to 1800° C. and to calcine this mass to 98% calcination. In addition, a quantity of heat is required to compensate for heat losses from the equipment. To gain 300,000 B.t.u.'s of heat energy requires about 2 gallons of fuel oil, the heat of combustion being about 150,000 B.t.u./ gal. The amount of air required for the complete combustion of oil is about 128 pounds/gal., or about 255 pounds of air in total.

The total weight of the raw materials decreases during the calcining step to 365 pounds because of the carbon dioxide weight loss. The 365 pounds of raw material are then passed to the clinker unit, where they have to be heated to the clinkering temperature of 2400–2600° F. Since the sintering or clinkering reaction, per se, is somewhat endothermic, the total energy to be supplied is only about 75,000 B.t.u., which serves to heat the raw materials 1800° F. to 2400° F., and to bring 77 pounds of air completely to the sintering temperature.

The clinkers are then forwarded to the clinker cooler, where they are cooled by the means of the total amount of air, i.e., 332 pounds, required in the combustion processes. The temperature of these gases is about 1800° F. when the gases leave the clinker cooler.

The excellent heat economy of the present process is illustrated by the fact that only about 2½ gallons of oil are required to produce 365 pounds of clinkers. This figure includes the necessary energy to compensate for the heat losses in the plant, through the brickwork of preheating, calcining and clinkering units.

In the foregoing, a preferred cement burning facility was discussed, which utilizes raw materials of the least advantageous nature, i.e. with a certain alkali content which may be considerably greater than the maximum alkali content which can be tolerated for use in other types of cement burning plants. However, it should be realized, that the present process is also suitable to produce cement from more ideal raw materials with relatively low alkali contents, and especially for producing cement from raw materials entirely free of alkalis, with considerable simplification of the necessary equipment and with the same energy economy as discussed above. Where no alkalis, or only insignificant amounts thereof are present, the indirect preheater may be dispensed with according to the broad aspects of the invention discussed supra. In addition, the calcining and sintering steps may be carried out in the same furnace, further simplifying the facilities required to carry out the present process.

What is claimed is:

1. A cement burning plant including individual units for preheating, calcining, clinkering and clinker cooling, for producing particulate clinkers of controlled particle size from a feed of pulverized raw materials, comprising:
    (a) preheating means having first raw material inlet and outlet means and defining a raw material passage therebetween, said preheating means further defining a first gas inlet an doutlet means and a gas channel in heat conducting relation with said raw material passage, said first raw material inlet means being disposed to receive said feed of raw materials, and said gas inlet being disposed to receive gases heated in said units for calcining, clinkering and clinker cooling;
    (b) a calcining furnace comprising an enclosure defining a combustion chamber having a second raw material inlet and outlet means, second gas inlet and gas outlet means, and fuel injection means for introducing a combustible heating fuel into said combustion chamber, said second raw material inlet being connected to said first raw material outlet, and said second gas outlet means being connected to said first gas inlet, and said second gas inlet means and said second raw material inlet means being spacially arranged to direct incoming gas at pulverized raw materials entering said calcining furnace through said second raw material inlet, to temporarily suspend pulverized raw materials within said combustion chamber;
    (c) a clinkering furnace comprising an enclosure defining a combustion chamber having a third raw material inlet and gas outlet, and second fuel injection means disposed therein, said clinkering furnace further defining an upwardly directed throat of variable area in a lower portion of said clinkering furnace serving as a unitary third raw material outlet and gas inlet, said throat permitting adjustment of the velocity of said gas moving therethrough, whereby raw materials below a selected particle size may be prevented from leaving said clinkering furnace;
    (d) and a clinker-cooling means comprising a chamber having a fourth raw material inlet and outlet, and fourth gas inlet and outlet means and a gas passage extending therebetween in heat conducting relation with said chamber, said fourth raw material inlet and fourth gas outlet means being connected to said throat of variable area in said clinkering furnace.

2. The cement burning plant of claim 1 further defined in that said first raw material inlet and gas inlet are unitary and tangentially disposed to produce a cyclone action in said preheater means.

3. The cement burning plant of claim 1, further defined in that said second raw material inlet and outlet means are interconnected to provide a raw material feedback passage therebetween.

4. The cement burning plant of claim 1, further defined in that said plant includes draft fans disposed in the gas passages leading through said calcining and clinkering furnaces respectively to apportion the relative air flow therethrough.

5. A cement burning plant for producing particulate clinkers of controlled particle size from a feed of pulverized raw materials, comprising:
    (a) first direct preheater means having a first raw material inlet and outlet and defining a raw material passage therebetween, said first preheater means further defining a first gas inlet and outlet means and a direct heating gas channel extending through said raw material passage for suspending said raw materials;

(b) second indirect preheater means having a second raw material inlet and a second raw material outlet and defining a raw material passage therebetween, said second preheater means further defining a second gas inlet and second gas outlet and an indirect heating gas channel extending therebetween in heat conducting relation with said raw material passage and separated therefrom by a heat conducting member, said second indirect preheating means further defining a gas vent from said raw material passage;

(c) a calcining furnace comprising an enclosure defining a combustion chamber having a third raw material inlet means for receiving raw materials preheated in said direct and indirect preheater means, raw material outlet means, a third gas inlet means, and gas outlet means connected to supply gas to said direct heating, fluidizing gas channels in said preheater means and fuel injection means for introducing a combustible heating fuel into said combustion chamber, said third gas inlet means and said third raw material inlet means being spacially arranged to direct incoming gas at pulverized raw materials entering said calcining furnace through said third raw material inlet to temporarily suspend said pulverized raw materials within said combustion chamber;

(d) a clinkering furnace comprising an enclosure defining a combustion chamber having a fourth raw material inlet and outlet means, a fourth gas inlet and outlet means, and second fuel injection means disposed therein, said fourth raw material outlet being connected to said third raw material outlet from said calcining furnace, and said fourth gas inlet being disposed to direct a stream of incoming gas of predetermined velocity and volume flow at said raw materials entering said clinkering furnace through said fourth raw material inlet means to suspend raw materials of a particle size less than a selected value within said combustion chamber, and said fourth gas outlet being connected to said second gas inlet leading to said indirect heating gas channel through said second preheater means.

6. The cement burning plant of claim 5, further defined in that said cement burning plant includes clinker cooling means comprising a chamber having a fifth raw material inlet and outlet and a fifth gas inlet and outlet means defining an air passage extending therebetween in heat conducting relation with said chamber, said first gas outlet being connected to said third and fourth gas inlet means in said calcining furnace and said clinkering furnace to define an air passage thereinto.

7. The cement burning plant of claim 6 further defined in that said fourth gas inlet and fourth raw material outlet are unitary and are connected to said clinker cooler through a unitary channel adapted to conduct the flow of raw materials and gases in opposite directions.

8. The cement burning plant of claim 5, further defined in that said first preheating means comprises a plurality of individual compartments disposed in successively stacked and nested relation to each other, each of said compartments having a unitary raw material and gas inlet, a raw material outlet and a gas outlet, the raw material outlet of a last compartment being connected to said third raw material inlet of said calcining furnace, and each raw material outlet of the other compartments being connected to said unitary gas and raw material inlet of the succeeding compartment toward said last compartment, and the gas outlet of a first compartment being connected to said second gas inlet of said second preheating means, and each gas outlet of the other compartments being connected to said unitary gas and raw material inlet of the succeeding compartment toward said first compartment.

9. The cement burning plant of claim 8, further defined in that said compartments comprise a cylindrical upper portion and have a conical bottom portion centrally defining said raw material outlet of said compartment, and in that said unitary gas and raw material inlets are disposed tangentially adjacent said upper cylindrical portions.

10. The cement burning plant of claim 8 further defined in that air locks are disposed in the raw material passages connecting said raw material outlets of said individual preheater compartment to said unitary raw material inlets of succeeding preheater compartments for impeding the flow of gases in a direction opposite to the flow of said raw materials.

11. The cement burning plant of claim 5, further defined in that said second preheater means defines a central, generally cylindrical compartment having a conical bottom defining said second raw material outlet, and that said second raw material inlet is connected to said first gas outlet from said first preheating means and projects tangentially into said cylindrical compartment of said second preheating means.

12. The cement burning plant of claim 5, further defined in that draft fans are disposed in said air passages through said clinker and said calcining furnace for apportioning the relative gas flow therethrough.

13. The cement burning plant of claim 5, further defined in that said plant includes means for apportioning the relative flow of raw materials feed quantities into said direct and indirect preheater means.

14. The cement burning plant of claim 5 further defined in that said second indirect preheater means also defines a second direct heating gas passage between said raw material inlet and outlet for suspending said raw materials therein.

15. The cement burning plant of claim 5 further defined in that said third raw material inlet means and said third raw material outlet means of said calcining furnace are interconnected by a feedback line for recirculating a portion of said raw materials through said calciner.

16. The cement burning plant of claim 5, further defined in that air locks comprising a flexible barrier impeding the flow of gas are disposed in raw material passages between said calciner and clinkering furnaces and said direct and indirect preheater means.

17. In a cement burning process for producing particulate clinkers of a predetermined particle size from a pulverized raw material feed, the steps comprising successively passing said pulverized raw materials through preheater means, calciner and clinkerer furnaces, and clinker cooler means, said preheater means including both direct and indirect preheating means, and respectively raising the temperature of said raw materials to about 1800° F. and 2400° F. in said calciner and clinkerer furnaces, forcing a stream of gas through said clinker cooler means for cooling said clinkers and absorbing heat energy from the clinkers in said clinker cooling means, passing a first portion of said gas emerging from said clinker cooler successively through said calciner furnace and said direct preheater means for heating said pulverized raw materials passing therethrough by direct contact therewith, and passing a second portion of said gas emerging from said clinker cooler through said clinkerer furnace and said indirect preheater means.

18. The process of claim 17, further defined in that said calciner furnace and clinkerer furnace define separate fluidized bed reactor enclosures, and said gas is passed therethrough at a velocity and volume flow sufficient to fluidize said pulverized raw materials therein.

19. The process of claim 18, further defined in that said gas is passed into said clinkerer furnace at a velocity and volume flow sufficient to suspend raw material particles below a selected particle size.

20. The process of claim 17, further defined in that said preheaters comprise direct and indirect preheating means disposed in parallel, and in that said pulverized raw materials emerging from said preheaters are passed into said calciner furnace, and in that the ratio of the raw materials passed through said direct and indirect preheaters corresponds to the ratio of said first and second portions of said gas emerging from said clinker cooler means.

References Cited
UNITED STATES PATENTS

| | | | |
|---|---|---|---|
| 1,605,279 | 11/1926 | Pike | 263—53 |
| 2,157,321 | 5/1939 | Bussmeyer | 263—53 X |
| 2,469,989 | 5/1949 | Pyzel | 263—53 X |
| 3,139,463 | 6/1964 | Wuhrer | 263—53 |

JOHN J. CAMBY, Primary Examiner

U.S. Cl. X.R.

106—100; 263—53